(12) United States Patent
Le Roy et al.

(10) Patent No.: US 8,239,456 B2
(45) Date of Patent: *Aug. 7, 2012

(54) MANAGING NAVIGATION HISTORY FOR INTRA-PAGE STATE TRANSITIONS

(75) Inventors: Bertrand C. Le Roy, Bellevue, WA (US); Simon Calvert, Sammamish, WA (US); Nikhil Kothari, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/215,831

(22) Filed: Aug. 23, 2011

(65) Prior Publication Data

US 2011/0307607 A1    Dec. 15, 2011

Related U.S. Application Data

(63) Continuation of application No. 11/852,995, filed on Sep. 10, 2007, now Pat. No. 8,005,946.

(51) Int. Cl.
*G06F 15/16* (2006.01)
(52) U.S. Cl. ........ 709/204; 709/203; 709/219; 709/224; 709/227; 715/234; 715/760
(58) Field of Classification Search .................. 709/203, 709/219, 224, 227; 715/234, 760
See application file for complete search history.

(56) References Cited

U.S. PATENT DOCUMENTS

| | | | |
|---|---|---|---|
| 6,820,111 B1 | 11/2004 | Rubin et al. | |
| 7,050,976 B1 | 5/2006 | Packingham | |
| 8,005,946 B2 * | 8/2011 | Le Roy et al. | 709/224 |
| 2002/0023178 A1 | 2/2002 | Strasnick et al. | |
| 2002/0191015 A1 | 12/2002 | Brown et al. | |
| 2005/0114782 A1 | 5/2005 | Klinger | |
| 2005/0204292 A1 | 9/2005 | Kibilov et al. | |
| 2005/0273463 A1 | 12/2005 | Zohar et al. | |
| 2007/0005389 A1 | 1/2007 | Apparao et al. | |
| 2008/0282175 A1 | 11/2008 | Costin | |

OTHER PUBLICATIONS

A Client-Server Architecture for Rich Visual History Interfaces http://hcil.cs.umd.edu/trs/99-22/99-22.html.
A web information organization and Management system (WIOMS) http://delivery.acm.org/10.145/380000/372464/p565-grayson.pdf?key1=372464&key2=2005971811&coll=GUIDE&CFID=21353-25&CFTOKEN=62256210.
Yahoo! UI Library: Browser History Manager [experimental] http://developer.yahoo.com/yui/history/.
Managing Application State http://dotnetjunkies.com/MobileQuickstart/(ma5pne55bq3a0q450w1a1n55)/doc/StateManagement.aspx.

(Continued)

*Primary Examiner* — Yves Dalencourt
(74) *Attorney, Agent, or Firm* — Workman Nydegger (57) ABSTRACT

An intra Web-page navigation history mechanism allows history points to be tracked even for state transitions within the same Web page. A Web page may be subjected to a number of different state changes as the Web application executes. Along the way, a number of the state changes may be tracked as history points. When a history point is created, associated state is also recorded. When the history point is again navigated to, a navigation event may be raised along with the associated state for the history point. Various components (whether on the server or client) may listen to that event and reconstruct their respective states by using selective portions of the reconstruction state.

20 Claims, 7 Drawing Sheets

OTHER PUBLICATIONS

StateWebCharts: a Formal Description Technique Dedicated to Navigation Modeling of Web Applications http://virtual.inesc.pt/dsvis03/papers/27.pdf.

Nikhal Kothari's Weblog: Back Button Support for Atlas Update Panels; http://www.nikhil.net/BackButtonSupport.aspx, pp. 1-11.

Notice of Allowance mailed May 4, 2011 in U.S. Appl. No. 11/852,995.

Office Action dated Dec. 10, 2009 cited in U.S. Appl. No. 11/852,995.

Office Action dated Jun. 8, 2010. cited in U.S. Appl. No. 11/852,995.

* cited by examiner

MANAGING NAVIGATION HISTORY FOR INTRA-PAGE STATE TRANSITIONS

PRIORITY

This Application is a continuation of U.S. patent application Ser. No. 11/852,995 (filed Sep. 10, 2007) which issued as U.S. Pat. No. 8,005,946 on Aug. 23, 2011, the entirety of which is incorporated herein by reference.

BACKGROUND

Network applications (and in particular, Web applications) are advantageous in that they can reach a large audience. The client is typically equipped with a browser. Traditionally, network applications had been request-response oriented. For instance, the browser of the client issues a request for a Web page from a server. The server then provides the Web page to the client, whereupon the browser renders the Web page. If another Web page is desired, the browser (in response to executing script and/or in response to user action) would issue a request for another Web page, and so forth. Thus, Web navigation would proceed from Web page to Web page. In this context, Web navigation was a simple issue. If the user navigates backward (e.g., by pressing the "back" button), the browser would simply render the prior page.

The use of scripting languages and server-side technologies permits some enhancement to this basic Web browsing experience by allowing controls to be embedded in the Web page. In traditional scripting, if the Web application is to retrieve any information from a database or a file on the server, or send user information to a server, the browser would engage in form posting or linking to interface with the server. The browser would then retrieve the Web page from the server, and render the next Web page.

One conventional technology, often referred to in the industry as Asynchronous JavaScript And Xml ("AJAX") offers a significant enhancement on this traditional Web navigation experience. With AJAX implemented with JavaScript, the script communicates directly with the server through the JavaScript XMLHttpRequest object. Using this object, a Web page can make a request to, and get a response from a Web server—without reloading the page. Such requests are often referred to as "asynchronous postbacks". The browser will stay with the same page loaded, and the user will not notice that scripts request updated data, or send data to a server in the background. Thus, this type of technology permits Web application to be built around a single Web page.

However, browser navigation is a much more difficult problem to solve in the context of such rich applications. The user might have performed many tasks, and experienced many state changes in the context of a single Web page. However, if the users click the browser's Back button, by default the browser does not return to a previous state of the page (for example, the state before the most recent asynchronous postback). Instead, the browser unloads the page entirely and returns to the page that was displayed before your page was started. This is often not what the user intended.

BRIEF SUMMARY

In accordance with one embodiment described herein, an intra Web-page navigation history mechanism allows history points to be tracked even for state transitions within the same Web page. Accordingly, a Web page may be subjected to a number of different state changes as the Web application executes. Along the way, a number of history points may be tracked. Those history points may be later navigated to by, for example, selecting the backward navigation control, or perhaps by selecting one of the history points as a bookmark.

A navigation history may be formulated by, for example, a Web application determining that a state transition of a Web page is to be included as a history point in the navigation history. This is made possible even though the state transition does not involve the loading of a new Web page, but may simply be an updated state of the currently loaded Web page. A function call may then be placed to cause the history point to be recorded along with reconstruction state for that history point.

If a history point is later navigated to, a navigation event may be raised with the reconstruction state being also provided. The reconstruction state may be a composite state that includes reconstruction state designated in the original function call that created the history point. Components in the server and/or in the client may monitor such events, and use selective portions of the reconstruction state, to thereby reconstruct their respective renderings at that particular history point. In one embodiment, at development time, the application developer may draft code that uses the reconstruction state to reconstruct the page to its state associated with the history point.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

An intra Web-page navigation history mechanism allows history points to be tracked even for state transitions within the same Web page. A Web page may be subjected to a number of different state changes as the Web application executes. Along the way, a number of the state changes may be tracked as history points. When a history point is created, associated state is also recorded. A user might then navigate to the history point in any number of ways. The user might, for example, use a bookmark of the history point, or backwards or forwards navigate to the history point. In any case, when the history point is again navigated to, a navigation event may be raised along with the associated state for the history point. Various components (whether on the server or client) may listen to that event and reconstruct their respective states by using selective portions of the reconstruction state.

Figure 1:
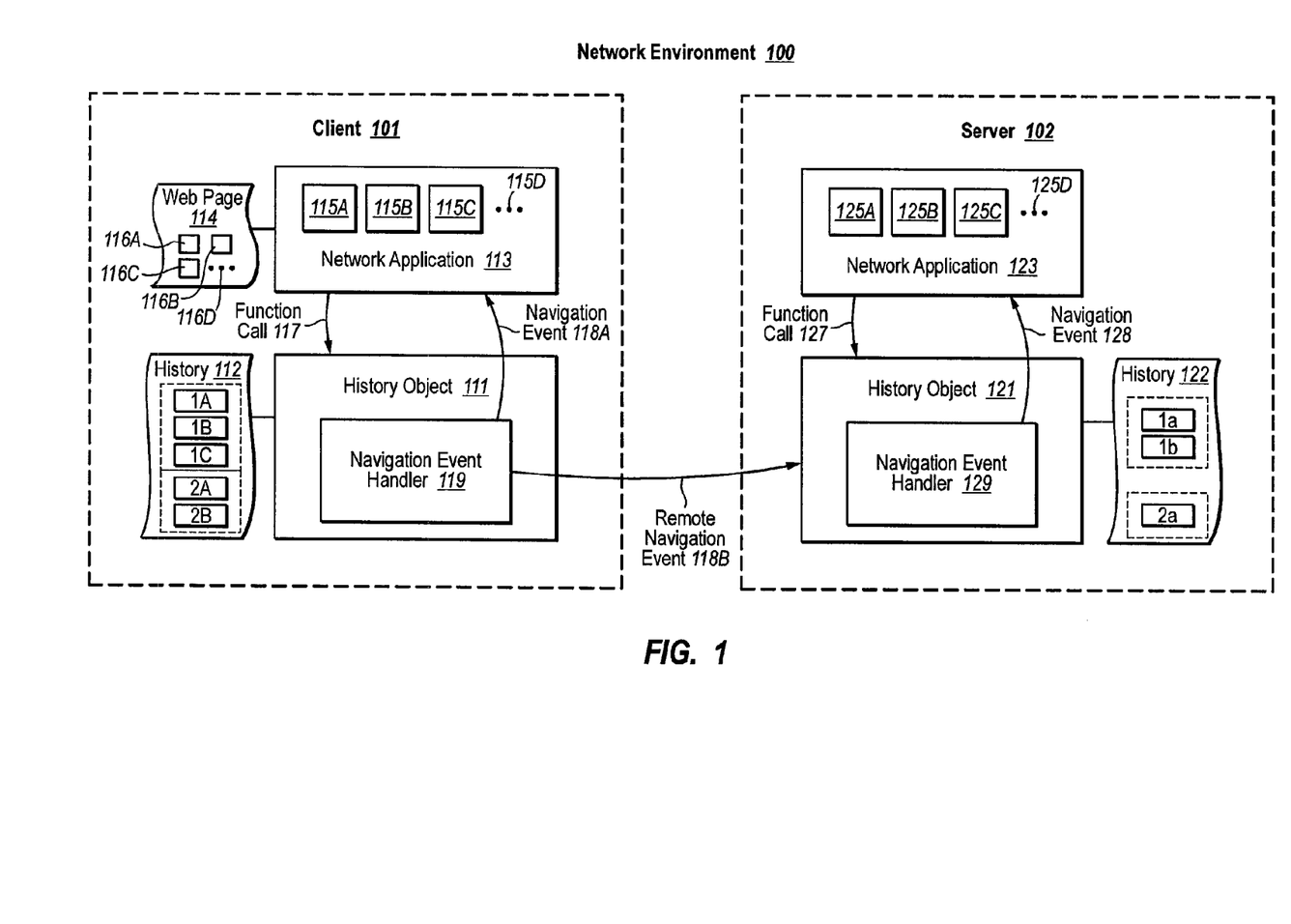
FIG. 1 illustrates a network environment in which embodiments described herein may operate.

FIG. 1 illustrates a network environment 100 in which embodiments described herein may operate. The network environment 100 generally includes two computing systems 101 and 102. The computing system 101 will be referred to as a "client" computing system (or "client"), and the computing system 102 will be referred to as a "server" computing system (or "server"). More regarding FIG. 1 will be described once some terminology is explained.

As networking technologies become richer, the distinction between a "client" and "server" is becoming blurred. Accordingly, the term "server" and "client" should be construed broadly herein. A "server" computing system is thus any computing system that provides data or other service to another computing system, whereas a "client" computing system is thus any computing system that receives data or service from a server computing system. A client computing system in one context may be a server computing system in another context, and vice versa.

Figure 2:
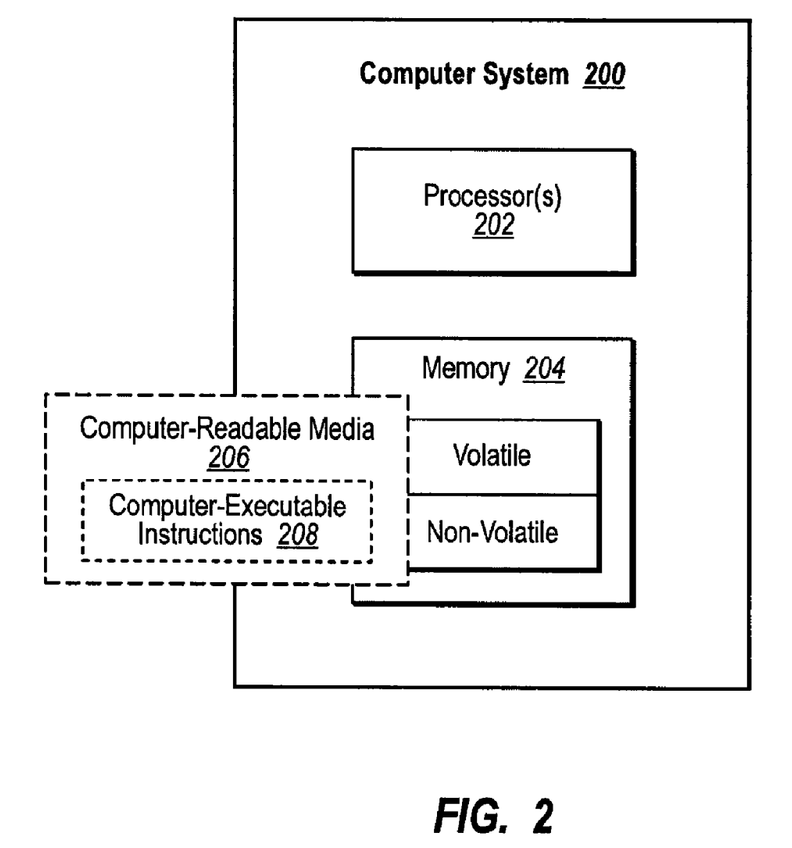
FIG. 2 illustrates a computing system representing just one of numerous examples of a computing system that may be used for either or both of the client computing system and/or the server computing system of FIG. 1.

The term "computing system" is also to be construed broadly to include any device or system that includes at least one processor capable of executing instructions from an associated memory. For example, FIG. 2 illustrates a computing system 200 representing just one of numerous examples of a computing system that may be used for either or both of the client computing system 101 and/or the server computing system 102. The computing system 200 is illustrated as including one or more processors 202 and memory 204. The memory 204 may include volatile and/or non-volatile memory components. As the term is used herein, persistent memory or storage are encompassed within the definition of "non-volatile" memory.

The computing system may itself even be distributed over a network. When computer-executable methods are described herein, such computer-executable methods may be accomplished via the use of a computer program product. Such a computing program product may include one or more computer-readable media having thereon computer-executable instructions that, when executed by one or more processors of the computing system, cause the computing system to perform the method.

The computer-readable media may carry or have computer-executable instructions or data structures thereon. Such computer-readable media can be any available media that can be accessed by a general purpose or special purpose computer. By way of example, and not limitation, such computer-readable media can be physical such as, for example, memory and/or storage such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. In contrast, when information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Referring to FIG. 2, the one or more computer-readable media 206 may include all or portions of the memory 204 or may otherwise be included in the computing system 200. Alternatively, or in addition, the one or more computer readable media 206 may be external to the memory (or even perhaps external to the computing system 200), but may include computer-executable instructions 208 that may be loadable into the memory 204 for execution by the processor(s) 202. Due to the wide-ranging possibilities of the computer-readable media 206 and computer-executable instructions 208 with respect to the memory 204 and computing system 200, the computer-readable media 206 and the computer-executable instructions 208 are symbolically illustrated as being both internal to and external to the memory 204 and computing system 200.

Computer-executable instructions comprise, for example, instructions and data which cause a general purpose computer, special purpose computer, or special purpose processing device to perform a certain function or group of functions upon execution by the processor(s) 202. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Referring back to FIG. 1, the client computing system 101 and the server computing system 102 interact to formulate a navigation history that includes state transitions within a Web page. As previously mentioned, Web browsing technologies had historically been Web-page oriented. For instance, a Web browser might navigate to one static Web page, then to another, then to another, and so forth. However, more recently, Web pages have been used as the basis for richer network application.

Figure 4:
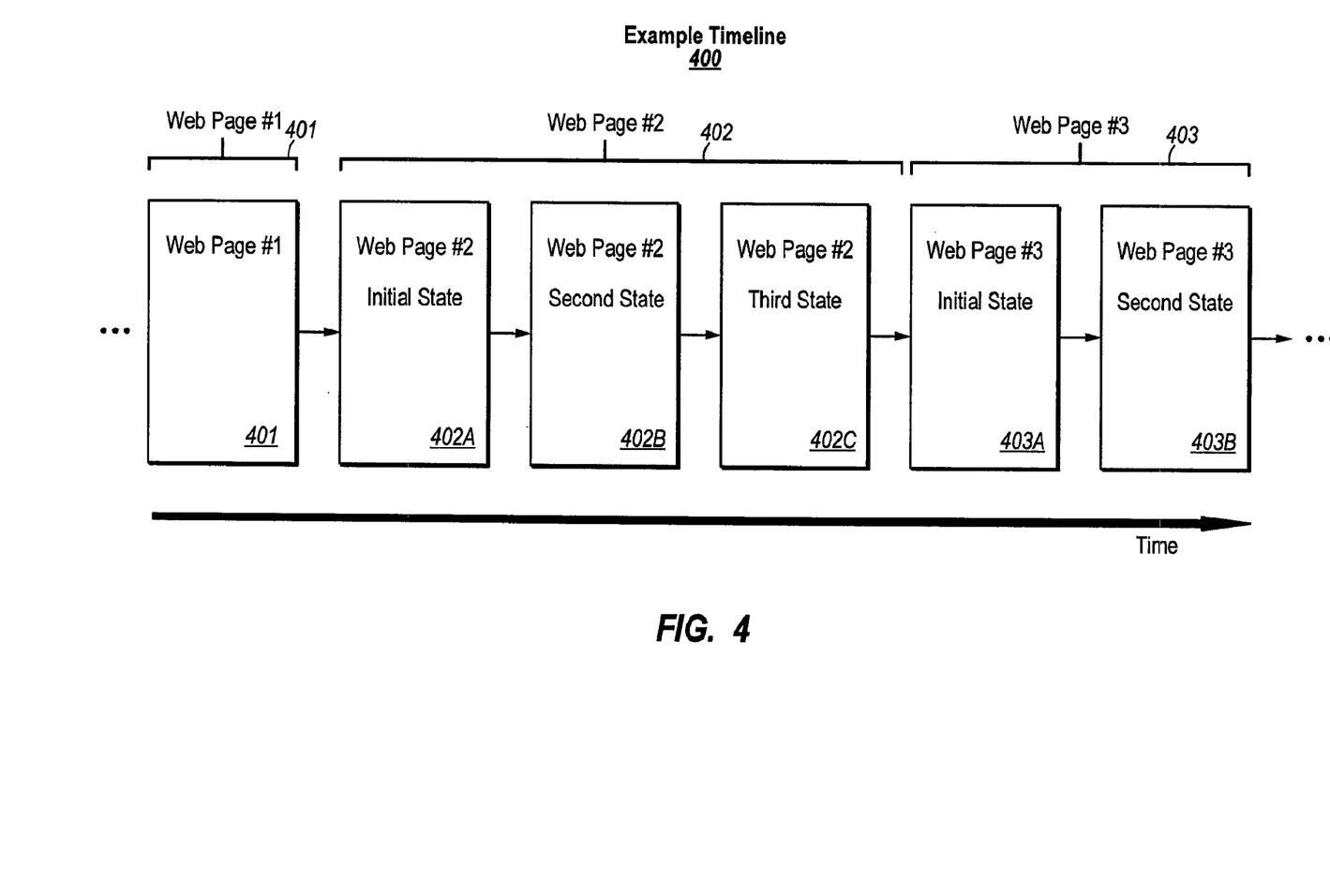
FIG. 4 illustrates a Web navigation timeline showing navigation to a number of Web pages, in which several of the Web pages may undergo state transitions.

For instance, a browser might navigate to one Web page, and then that Web page may dynamically undergo a number of state changes to enrich the user experience with that Web page. For instance, FIG. 4 illustrates an example timeline 400 that a user might experience. According to the example of FIG. 4, the timeline begins with the browser navigated to a Web page 401 (also referred to as "Web Page #1). The browser might then navigate to a second Web page 402 (also referred to as "Web Page #2"). Web page #2 might offer a richer application by allowing several dynamic changes to the Web page, without having to reload the Web page. Such experiences are enabled by, for example, AJAX technology, using asynchronous postbacks. In FIG. 4, for example, the Web Page #2 is loaded in an initial state 402A, after which it undergoes a state transition to a second state 402B, after which it then undergoes a second state transition to third state 402C. Although this example shows two state transitions total (and three total states 402A, 402B and 402C), there may be any number of state transitions when interfacing with a rich Web page. Referring again to FIG. 4, the user might then navigate to a third Web page 403 (also referred to as "Web Page #3). The Web page #3 might initially be loaded in an initial state 403A, after which a state transition occurs to a second state 403B and so forth.

In traditional navigation history experience, when the user navigates backward, the previous Web page is once again reloaded. For example, if the browser was displaying the Web page #2, and the user navigates backwards, the browser would reload Web page #1. In contrast, the embodiments described herein permit the state transition context within a particular Web page to be taken into consideration when navigating backward. For example, if the browser was displaying the third state 402C of the Web page #2, then a backward navigation might display a previous state in that same Web page. For instance, if the second state 402B was a history point in the navigation, the backward navigation would reconstruct the Web page #2 with its second state 402B. If the second state 402B was not a history point in the navigation, but the initial state 402A was, the backward navigation would reconstruct the initial state of the Web page #2.

Figure 3A:
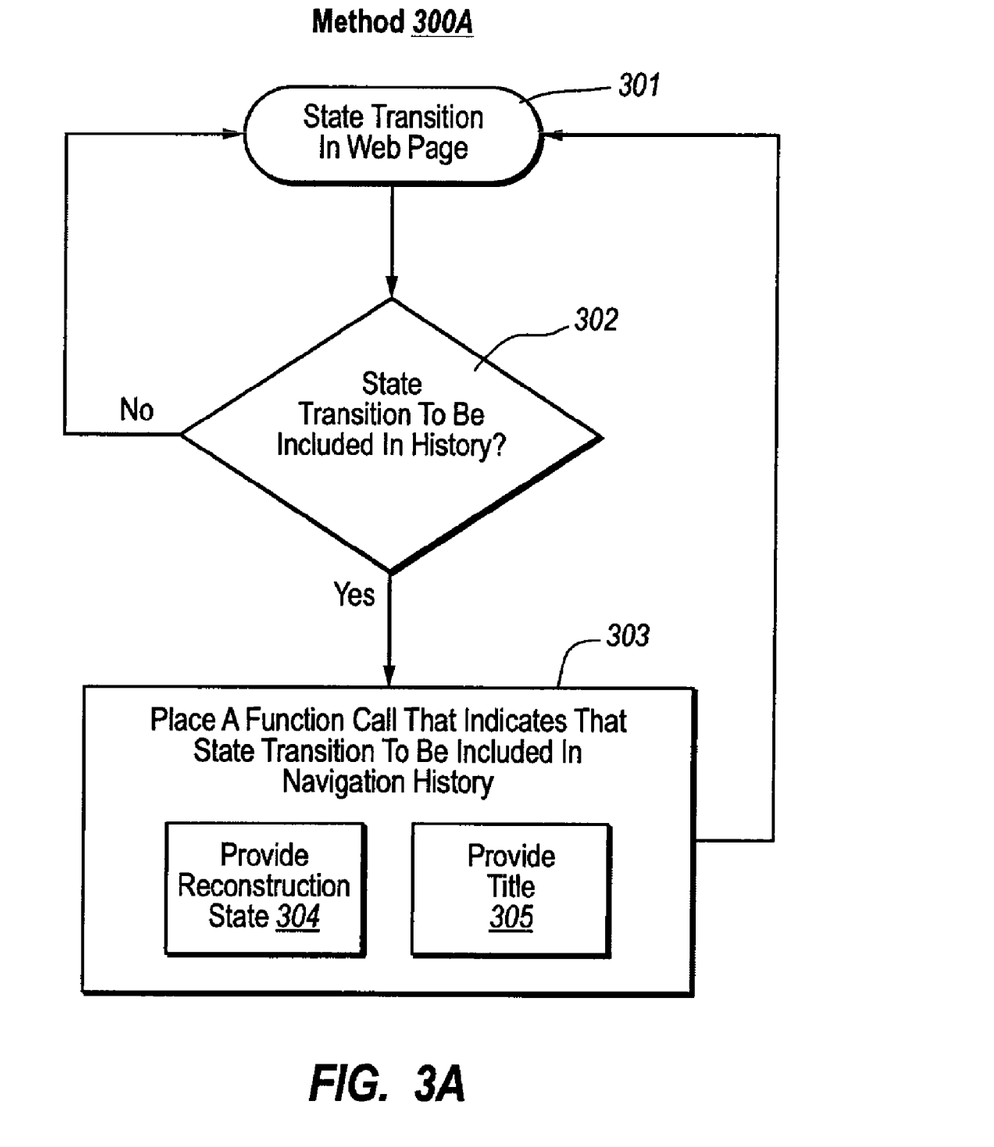
FIG. 3A illustrates a flowchart of a method for formulating a navigation history that includes state transitions within a Web page by issuing a function call.

FIG. 3A illustrates a flowchart of a method 300A for formulating a navigation history that takes into account such state transitions within a Web page. The method 300A will be described with frequent reference to the network environment 100 of FIG. 1. Referring to FIG. 1, each of the client 101 and the server 102 includes a network application. For instance, the client 101 includes a network application 113, and the server application includes a network application 123. The network application may be implemented completely on the client 101, in which case there might not be a need for the server network application 123. On the other hand, the network application may be implemented completely on the server 102, in which case there might not be a need for the client network application 113. In a distributed application, however, the client 101 and the server 102 will both have logic implemented in their respective versions of their network application, and thus there would be a client-side network application 113, and a server-side application 123. The method 300A may be performed by either or both of the client-side application 113 and the server-side application 123.

Referring to FIG. 3A, the method 300A is initiated upon detection of a state transition within a Web page (act 301). While a browser might easily detect a transition from one page to another, the network applications 113 and 123 may detect transitions within a Web page, and indeed, may include functionality to cause such transitions. For instance, referring to FIG. 4, the Web page #2 may transition from its initial state 402A to its second state 402B, or from its second state 402B to its third state 402C.

It is then determined whether or not the state transition is to be included within the navigation history (decision block 302). If it is not to be included (No in decision block 302), then the process stops until the next state transition is detected (act 302). While it may be that all state transitions are included in the navigation history, embodiments described herein also allow a user or page designer to specify what state transitions to include the navigation history. What state transitions to include, and what not to include, in the navigation history will depend on what the application developer considers as logical navigation points for the end user of the network application. The Web page developer may use a function call placed through an application program interface to specify what state transitions are to be considered history points in the navigation history. For example, in FIG. 4, perhaps the second state 402B of the Web page #2 is not considered significant enough to warrant inclusion in the navigation history, whereas the initial state 402A and third state 402C are. In that case, a backward navigation from the third state 402C would result in the initial state 402A of the Web page #2. In some cases, a function call might not be used to specify a navigation point. For example, perhaps the initial state of each Web page is included as a default history point in the navigation history.

In any case, if the state transition is to be included in the navigation history (Yes in decision block 302), the network application 113 and/or 123 may place a function call that at least impliedly represents that the state transition is to be included in the navigation history (act 303). Reconstruction state may be provided with this function call (act 304), or optionally as a separate function call. Optionally, a human-readable title may also be provided as part of this function call (act 305). The function of the title will be described further below.

The reconstruction state for the history point may include state useful to reconstruct that history point at a later time. The Web developer might specify what state would be useful for reconstruction, which in some cases, may well be less than all of the available information for that state. In one embodiment, the reconstruction state includes a Uniform Resource Locator (URL) to identify the Web page, and an array of values. If the names of such values were expressed, then the reconstruction state might include a number of name-value pairs. Otherwise, the name associated with a value may be implied by position of the value. In one embodiment, the particular state of a Web page may be represented by a Uniform Resource Identifier (URI) that includes the URL of the Web page along with a serialization of a form of the other reconstruction state. Thus, each history point may include such a URI, from which the reconstruction state may be extracted.

Referring to FIG. 1, for example, if the client-side network application 113 were performing the method 300A, the network application 113 might place a function call 117 to a history object 111. If the server-side network application 113 were performing the method 300A, the network application 123 might place a function call 127 to a history object 121. The history objects 111 and 121 may each be a single object, or may be a number of interacting objects. However, for simplicity, they are illustrated in FIG. 1 as a single object.

Figure 3B:
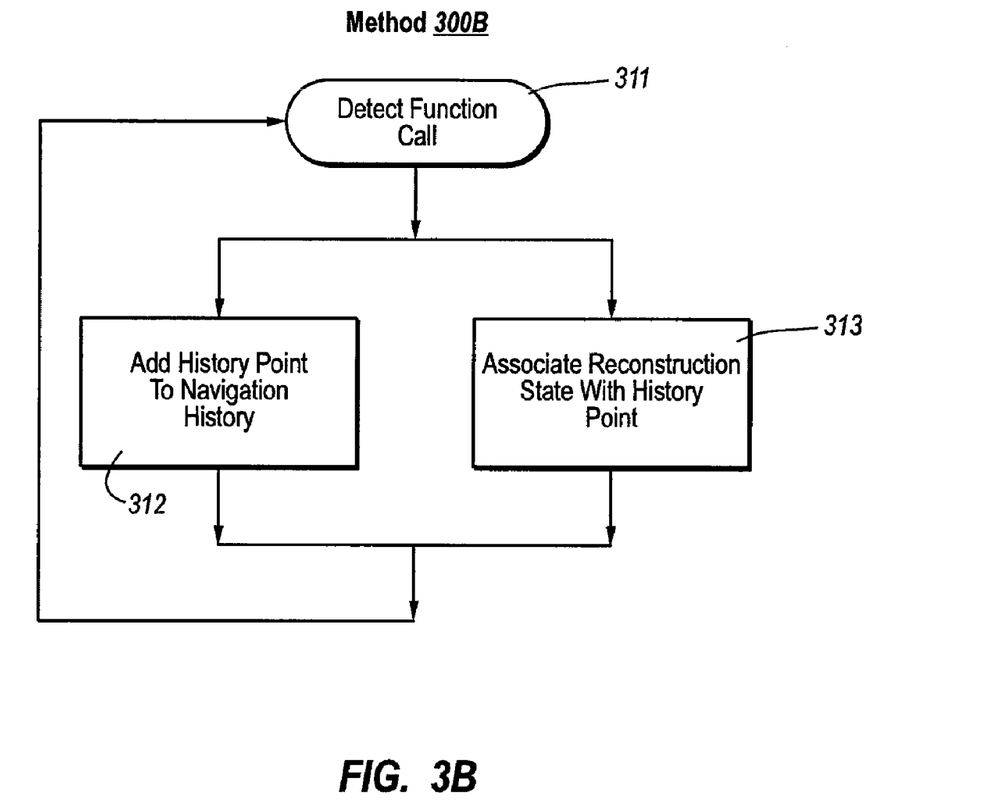
FIG. 3B illustrates a flowchart of a method for formulating a navigation history that includes state transitions within a Web page by receiving a function call.

FIG. 3B illustrates a flowchart of a method 300B for formulating a navigation history upon receiving function calls. The method 300B will also be described with frequent reference to FIG. 1. After the network application 113 (or 123) places the function call 117 (or 127), the history object 111 (or 121) receives the function call. The method 300B may thus be performed by the history object 111 and/or the history object 121.

Upon detecting the function call (act 311) through an application program interface. The history point is added to the navigation history (act 312) and the associated reconstruction state is associated with that history point (act 313). For instance, the history object 111 on the client may formulate the navigation history 112, whereas the history object 121 on the server may formulate the navigation history 122. The client-side navigation history 112 is illustrated as including three history points 1A, 1B and 1C for a first Web page, and two history points 2A and 2B for a second Web page. The server-side navigation history 122 is illustrated as including two history points 1a and 1b for the first Web page, and only one history point 2a for the second Web page.

Figure 5:
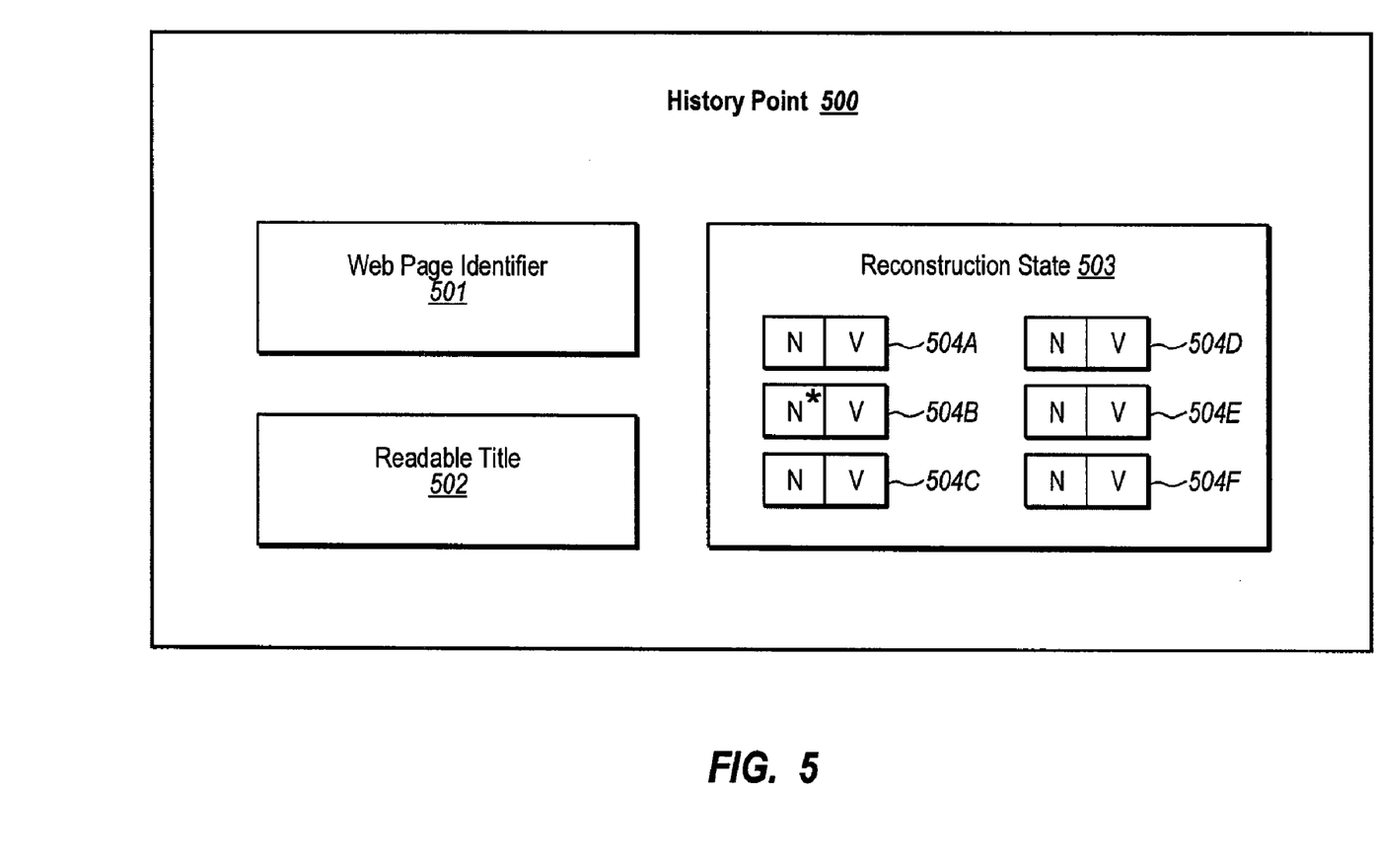
FIG. 5 schematically illustrates reconstructions state for a history point.

FIG. 5 schematically illustrates an example history point 500. The history point may include a Web page identifier (such as a Uniform Resource Locator or "URL"). A human-readable title 502 may also be included. In addition, a reconstruction state 503 is also provided. In one embodiment, some of this history point 500 may be expressed as a single Uniform Resource Identifier (URI). For instance, the URL representing the Web page identifying may be combined with the reconstruction state 503 to formulate a single URI that identifies a history point. The reconstruction state 503 includes a number of values 504A through 504F, whose name is either expressly or implicitly associated with the value.

This URI might not be very human-readable of friendly. Accordingly, when navigating through histories, the human-readable title 502 may be associated with the history point, and used as appropriate, to give more relevant information to a user regarding the history point. For instance, the human-readable title 502 might specify "Microsoft's Order Form (filled-out)" instead of what might be a much more lengthy URI that is less meaningful to a human reader.

Figure 6:
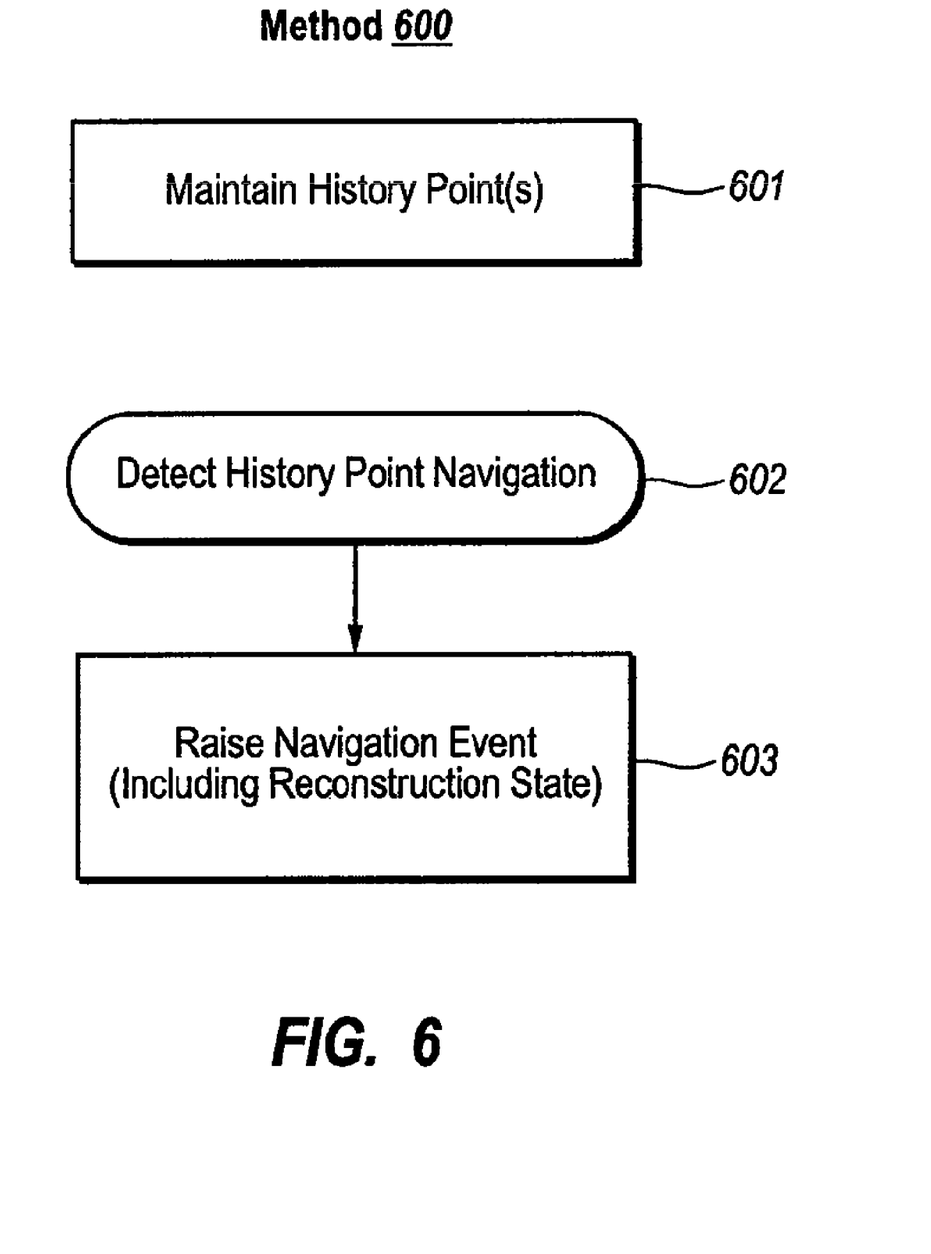
FIG. 6 illustrates a flowchart of a method for facilitating navigation using the navigation history.

Accordingly, the history objects 111 and/or 121 maintain this navigation history. FIG. 6 illustrates a method of using this navigation history to effectively navigate through various states of one or more Web pages. The history objects 111 and/or 121 maintain a number of history points (act 601). Some of these history points may represent state transitions within a Web page, while others might represent the more conventional transitions from one Web page to another.

Each of the history objects 111 and 121 may include, or be associated with, a navigation event handler 119 and 129, respectively. The navigation event hander detects when a history point is being navigated to. The history point may be navigated to in any number of ways. For instance, the user might select the back button, or forward button in the browser. Alternatively, the user might select a history point after having previously bookmarked the history point.

In any case, upon detecting that a history point is navigated to (act 602) as a result of some user action, the navigation event handler raises a navigation event that at least impliedly identifies a history point being navigated to, and at least impliedly identifies the reconstruction state (act 603). For instance, if the navigation event is raised by the navigation event handler 119, the navigation event 118A may be made available to any component on the client 101 that subscribed to this event. The reconstruction state may represent a superset of all the useful information (designated by perhaps the developer who drafted the source code representing the "add history point" function call) that may be useful to reconstruct the state. However, by specifying the reconstruction state as a set of name-value pairs, each component that subscribed to the event may review each name-value pair to identify for each name-value pair 1) whether or not the name-value pair is event relevant to the component for reconstructing its state for that history point, and 2) if relevant, what should be done with the associated value to reconstruct the component's state. Different name-value pairs may be relevant for different components. Another way to represent the state is using an array where the different parts of the state are specified in an index. However, the principles of the present invention are not limited to the manner in which the state is represented.

For instance, suppose that the client-side application 113 is responsible for rendering the Web page 114. Each component or control 115A, 115B, and 115C and potentially others 115D of the application may be responsible for rendering a particular portion of the Web page 114. For example, control 115A may render portion 116A, control 115B may render portion 116B, control 115C may render portion 116C, and so forth for other controls 115D and portions 116D.

Likewise, in a server-side rendering of the Web page 114, the control 125A may be used to render portion 116A, control 125B may be used to render portion 116B, and control 125C may be used to render portion 116C, and other controls 116D may be used to render other portions 116D of the Web page 114.

The components 115A through 115D may sift through each of the name-value pairs in the reconstruction state, extract the relevant information, and reconstruct their own states. Likewise, if the reconstruction state includes information relevant for the server, the navigation event handler 119 may cause a remote navigation event 118B to be raised, thereby informing the server-side event handler 129 of the navigation. For instance, name-value pair 504B of FIG. 5 is marked with an asterisk symbolizing that this particular name-value pair is used by the server. Upon receiving the remote navigation event 118B, the server-side navigation handler 129 may raise a similar event 128, thereby allowing for the network application 123 (and more particularly its components 125A through 125D) to update their respective state of that history point.

Accordingly, embodiments descried herein permit for history points to be created for particular states within Web pages, and permits navigation through such history points. Furthermore, such navigation may be done while keeping the state of the client and server synchronized. In addition, the reconstruction state is represented in composite form, allowing any component to be able to reconstruct its specific state by evaluating and using all or just portions of the reconstruction state.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for formulating a navigation history that includes states transitions within a Web page as managed by a client, the method performed in a computer system comprising one or more processors and system memory, the method comprising:
   detecting a first state transition within a Web page, wherein the first state transition is within a single Web page and results from the Web page making a request to, and getting a response from, a Web server, without reloading the Web page;
   detecting a second state transition within a Web page, wherein the second state transition is within the single Web page and results from the Web page making a request to, and getting a response from, a Web server, without reloading the page;
   determining whether the first and second state transitions are to be included in a navigation history, which includes:
      determining that the first state transition is to be included in the navigation history; and
      determining that the second state transition is to be excluded from the navigation history;
   in response to determining whether the first and second state transitions are to be included in a navigation history, placing a function call that at least impliedly represents that the first state transition is to be included in the navigation history; and
   providing reconstruction state for the first state transition along with the function call.

2. The method in accordance with claim 1, wherein the function call is to a server component.

3. The method in accordance with claim 1, wherein the function call is to a client component, and the computing system is a client.

4. The method in accordance with claim 1, wherein the reconstruction state is provided within the function call.

5. The method in accordance with claim 1, further comprising:
   detecting a third state transition within the same Web page, the third state transition also resulting from the single Web page making a request to, and getting a response from, the Web server, without reloading the Web page;
   determining that the third state transition is to be included in the navigation history;
   in response to determining that the third state transition is to be included in the navigation history, placing a second function call that at least impliedly represents that the third state transition is to be included in the navigation history; and providing reconstruction state for the third state transition along with the second function call.

6. The method in accordance with claim 1, wherein the reconstruction state is used to formulate a Uniform Resource Identifier that includes a Uniform Resource Locator that specifies the Web page, and includes state that is used to reconstruct a transitional state of the Web page.

7. The method in accordance with claim 1, wherein the method further includes placing a function call specifying a title to be used in the navigation history when representing the history point to a user.

8. A system for formulating a navigation history that includes states transitions within a Web page as managed by a client, the system comprising:
   one or more processors and system memory, wherein the one or more processors execute computer executable code and perform method steps including:
   detecting a first state transition within a Web page, wherein the first state transition is within a single Web page and results from the Web page making a request to, and getting a response from, a Web server, without reloading the Web page;
   detecting a second state transition within a Web page, wherein the second state transition is within the single Web page and results from the Web page making a request to, and getting a response from, a Web server, without reloading the page;
   determining whether the first and second state transitions are to be included in a navigation history, which includes:
   determining that the first state transition is to be included in the navigation history; and
   determining that the second state transition is to be excluded from the navigation history;
   in response to determining whether the first and second state transitions are to be included in a navigation history, placing a function call that at least impliedly represents that the first state transition is to be included in the navigation history; and
   providing reconstruction state for the first state transition along with the function call.

9. The system in accordance with claim 8, wherein the function call is to a server component.

10. The system in accordance with claim 8, wherein the function call is to a client component, and the computing system is a client.

11. The system in accordance with claim 8, wherein the reconstruction state is provided within the function call.

12. The system in accordance with claim 8, further comprising:
   detecting a third state transition within the same Web page, the third state transition also resulting from the single Web page making a request to, and getting a response from, the Web server, without reloading the Web page;
   determining that the third state transition is to be included in the navigation history;
   in response to determining that the third state transition is to be included in the navigation history, placing a second function call that at least impliedly represents that the third state transition is to be included in the navigation history; and
   providing reconstruction state for the third state transition along with the second function call.

13. The system in accordance with claim 8, wherein the reconstruction state is used to formulate a Uniform Resource Identifier that includes a Uniform Resource Locator that specifies the Web page, and includes state that is used to reconstruct a transitional state of the Web page.

14. The system in accordance with claim 8, wherein the system further performs placing a function call specifying a title to be used in the navigation history when representing the history point to a user.

15. A computer program product for performing a method of formulating a navigation history that includes states transitions within a Web page as managed by a browser within a client, the computer program product comprising one or more computer-readable storage devices having thereon computer-executable instructions that, when executed by one or more processors to perform the method steps of:
   detecting a first state transition within a Web page, wherein the first state transition is within a single Web page and results from the Web page making a request to, and getting a response from, a Web server, without reloading the Web page;
   detecting a second state transition within a Web page, wherein the second state transition is within the single Web page and results from the Web page making a request to, and getting a response from, the Web server, without reloading the page;
   determining whether the first and second state transitions are to be included in a navigation history, which includes:
   determining that the first state transition is to be included in the navigation history; and
   determining that the second state transition is to be excluded from the navigation history;
   in response to determining whether the first and second state transitions are to be included in a navigation history, placing a function call that at least impliedly represents that the first state transition is to be included in the navigation history; and
   providing reconstruction state for the first state transition along with the function call.

16. The computer program product in accordance with claim 15, wherein the function call is to a server component.

17. The computer program product in accordance with claim 15, wherein the function call is to a client component, and the computing system is a client.

18. The computer program product in accordance with claim 15, wherein the reconstruction state is provided within the function call.

19. The computer program product in accordance with claim 15, the instructions further comprising instructions for:
   detecting a third state transition within the same Web page, the third state transition also resulting from the single Web page making a request to, and getting a response from, the Web server, without reloading the Web page;
   determining that the third state transition is to be included in the navigation history;
   in response to determining that the third state transition is to be included in the navigation history, placing a second function call that at least impliedly represents that the third state transition is to be included in the navigation history; and
   providing reconstruction state for the third state transition along with the second function call.

20. The computer program product in accordance with claim 15, wherein the reconstruction state is used to formulate a Uniform Resource Identifier that includes a Uniform Resource Locator that specifies the Web page, and includes state that is used to reconstruct a transitional state of the Web page.

* * * * *